July 30, 1935.  A. MARCHEV ET AL  2,009,972
DUPLICATING MACHINE
Filed Oct. 13, 1934  3 Sheets-Sheet 1
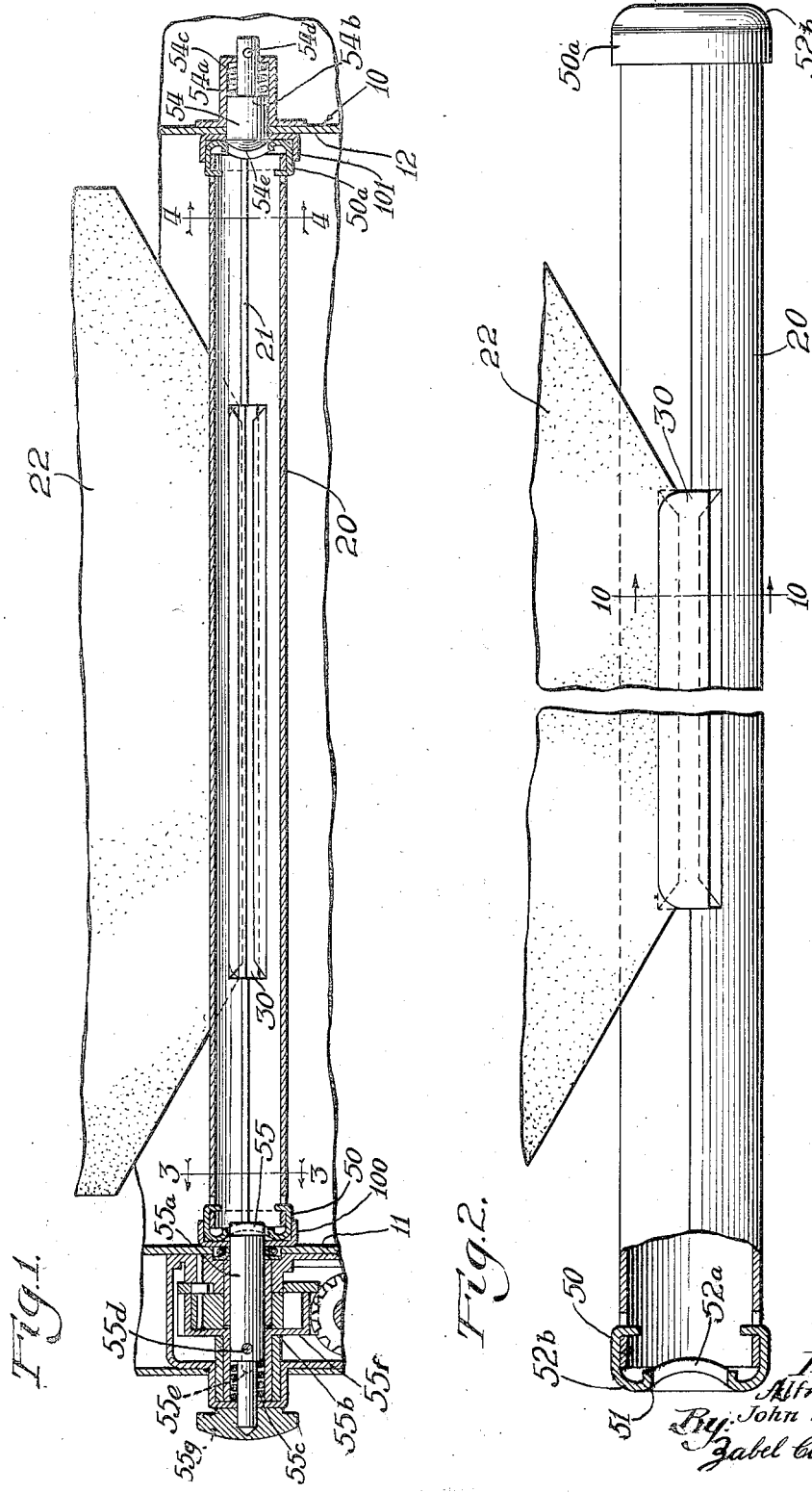

July 30, 1935.  A. MARCHEV ET AL  2,009,972
DUPLICATING MACHINE
Filed Oct. 13, 1934   3 Sheets-Sheet 2
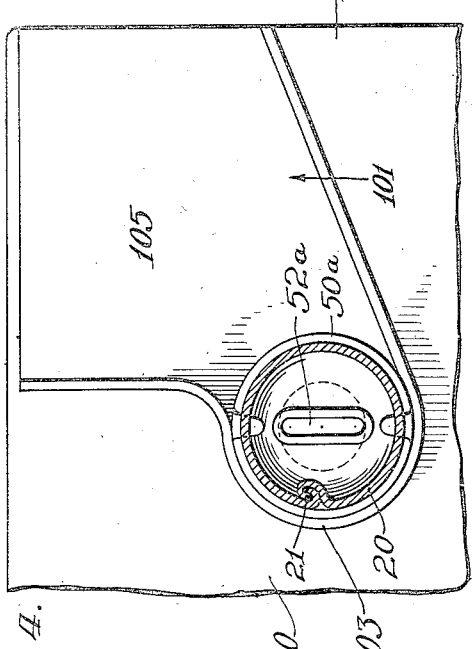
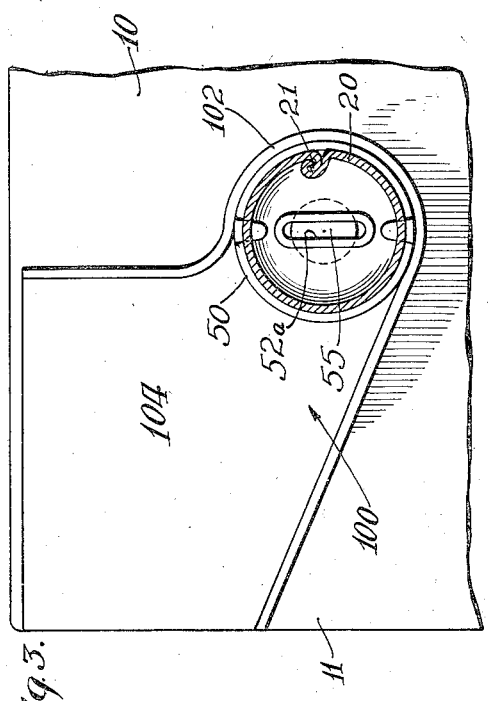
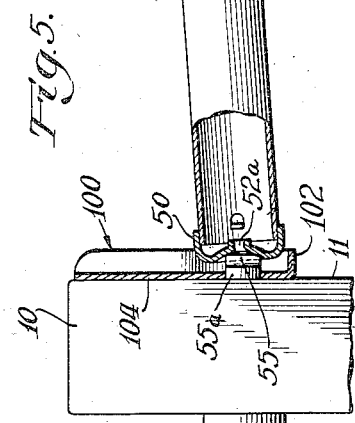

July 30, 1935.  A. MARCHEV ET AL  2,009,972
DUPLICATING MACHINE
Filed Oct. 13, 1934   3 Sheets-Sheet 3
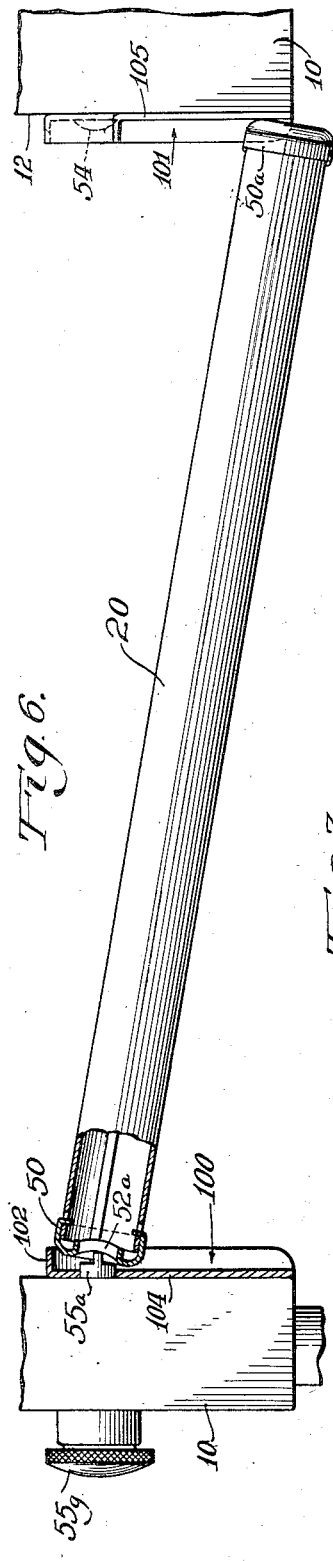
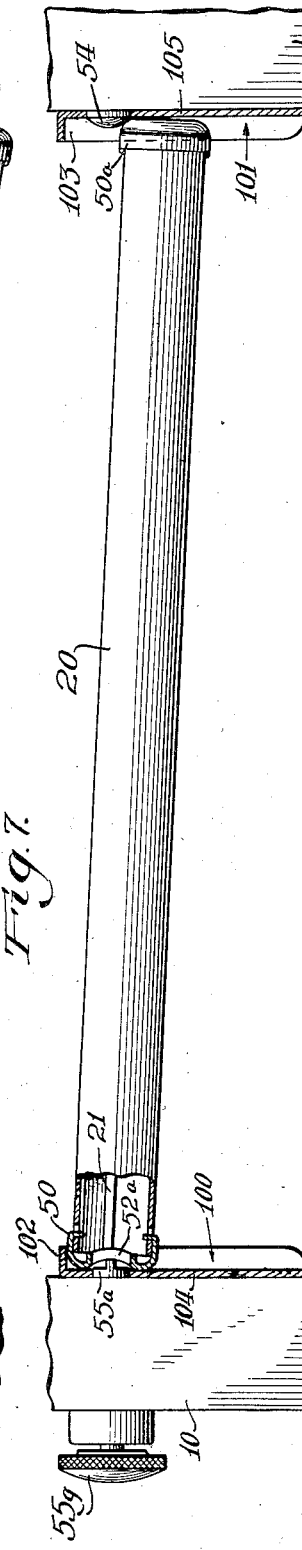
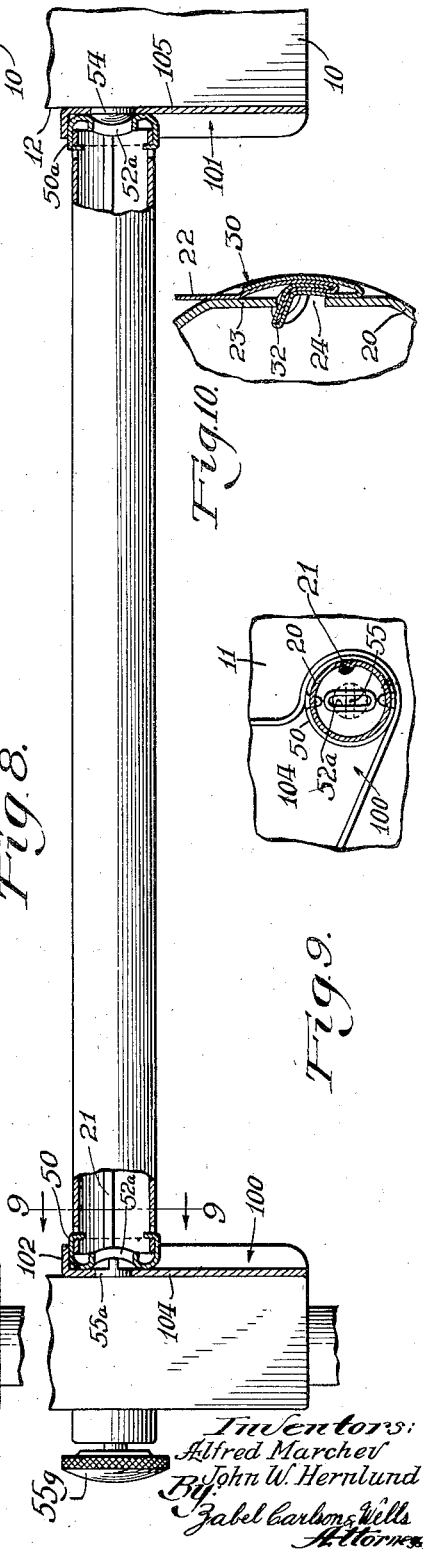
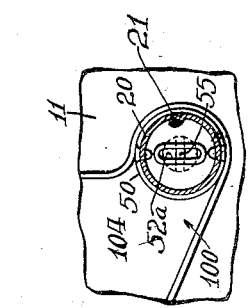
Inventors:
Alfred Marchev
John W. Hernlund
By Zabel Carlson Wells
Attorneys Patented July 30, 1935

2,009,972

UNITED STATES PATENT OFFICE 2,009,972

DUPLICATING MACHINE

Alfred Marchev and John W. Hernlund, La Grange, Ill., assignors to Ditto, Incorporated, Chicago, Ill., a corporation of West Virginia Application October 13, 1934, Serial No. 748,182

11 Claims. (Cl. 242—68)

The invention relates to spindles and apparatus for journalling them and is particularly adapted to be embodied in duplicating machines of the type shown and described in our co-pending applications, S. N. 663,405, filed March 29, 1933, now Patent No. 1,996,583 of April 2, 1935, and S. N. 692,679, filed October 7, 1933, now Patent No. 1,993,558 of March 5, 1935.

The invention may be embodied in apparatus which is identical in construction with the corresponding apparatus shown in either of the two co-pending applications identified above. The spindle shown in the accompanying drawings is identical with the spindle shown in our co-pending application S. N. 692,679, filed October 7, 1933.

The present invention relates to the construction of the spindles and the apparatus wherein they are journaled, the construction being such that a spindle having a heavy gelatin roll thereon may be inserted in a hectograph machine or withdrawn therefrom with comparatively little effort on the part of the operator.

One feature of the invention is the manner in which the spindle co-operates with a surface on the frame of the hectograph machine so that that surface functions as a cam and assists the operator in alining the spindle with the means which journal it. The cam surface thus provided on the frame is adapted to displace the spindle longitudinally when the operator displaces the spindle laterally.

In the preferred embodiment of the invention, one end of the spindle is preferably engaged with means for driving the spindle. The construction in the preferred form of the invention is such that the operator need not manipulate the spindle to provide the final driving engagement, it being only necessary that the driven end of the spindle be alined with the driving means. The operator then displaces the other end of the spindle toward the means for journalling it and the cam surface on the frame displaces the spindle and driving means against the action of a spring so that the end being displaced laterally may be brought into alinement with the means for journalling it.

Other advantages of the invention will become apparent as the following detailed description progresses, reference being had to the accompanying drawings, wherein Fig. 1 is a fragmentary transverse section taken through a hectograph machine, the section being taken through a spindle and means for journalling and driving it.

Fig. 2 is an enlarged side elevation, partly in section, of the improved spindle.

Fig. 3 is an enlarged fragmentary section taken on line 3—3 of Fig. 1.

Fig. 4 is an enlarged fragmentary section taken on line 4—4 of Fig. 1.

Fig. 5 is a fragmentary front elevation, partly in section, of a hectograph machine and illustrates the operation of inserting the improved spindle in the machine.

Fig. 6 is a fragmentary plan view of the apparatus shown in Fig. 5, the spindle being shown in the same position as it is shown in Fig. 5.

Fig. 7 is a fragmentary plan view, partly in section, illustrating the spindle in a changed position.

Fig. 8 is a fragmentary plan view, partly in section, showing the spindle alined with means for driving and journalling it.

Fig. 9 is a section taken on line 9—9 of Fig. 8, and.

Fig. 10 is a section taken on line 10—10 of Fig. 2.

Referring to the drawings wherein a preferred embodiment of the invention is illustrated, the reference character 20 designates generally a spindle which is preferably identical in construction with the spindle illustrated in Figs. 1 to 5, inclusive, of our co-pending application, S. N. 692,679. The spindle 20 is in the form of a cylinder, made of sheet metal, and has a longitudinally extending lock-seam 21.

22 designates a hectograph band adapted to be secured detachably to the spindle 20 and wound thereon. It may be mentioned that in hectograph machines, spindles are usually provided at each end of the platen or bed plate and the hectograph band is wound back and forth from one spindle to the other. To do this, it is necessary to attach one end of the hectograph band to the receiving spindle at the commencement of one winding operation. When this receiving spindle is full, the operation of the machine is reversed and the band is unwound from said spindle and wound on the other simultaneously. During the latter operation, when the end of the band is reached, it is desirable that this end detach itself automatically from the spindle in order to prevent breakage or tearing of the band. For this purpose, we have provided an attaching hook or fastening clip which is designated generally by the reference character 30. This construction of the clip 30 is illustrated in Figs. 1, 2 and 10 and it will be noted that it is identical in construction with the corresponding clip shown in our co-pending application, S. N. 692,679.

Not only is the clip 30 self detachable from the spindle 20 when the band 22 is unwound therefrom, but it is also self detachable from the spindle unless the band is under tension or several turns of the band have been wound around the spindle to hold the clip in engagement with it. This construction is exceedingly advantageous as it is never necessary for the operator to employ both hands to disengage the end of the band from the spindle.

Briefly, the spindle 20 is provided with a flattened face 23 in which is a centrally arranged slot 24. The clip 30 has a tongue 32 adapted to enter the slot 24 as illustrated in Fig. 10. It will be noted that the tongue 32 is substantially straight.

The spindle 20 is provided with cap members 50 and 50a at its ends, the cap members 50 and 50a being identical in construction so that the spindle is reversible. The outer end faces of the cap members 50 and 50a are provided with shallow circular concavities 51, each of which has a diametrically arranged slot 52a therein. The slots 52a are adapted to receive a tongue or lug 55 provided on the inner end of a stub shaft 55a which is slidably journaled in driving mechanism which is designated generally by the reference character 55b. A spring 55c yieldingly urges the shaft 55a to the right (Fig. 1) to hold it in the position wherein it is shown in Fig. 1 so that it will have a driving engagement with the adjacent end of the spindle 20, the lug 55 then projecting into the adjacent slot 52a.

A pin 55d projecting through the shaft 55a rides in a slot 55e in the hub of a gear 55f. The gear is part of the means for driving the shaft 55a and it will be readily understood that the shaft 55a may be displaced longitudinally to the left (Fig. 1) against the action of the spring 55c. If so desired, the shaft 55a may be retracted against the action of the spring 55c by pulling on a knob 55g secured to the outer end of the shaft 55a.

Disposed in opposed relation to the shaft 55a is a pin 54 which is slidably journaled in a socket 54a mounted on the frame of the duplicating machine, the frame being designated in general by the reference character 10. Interposed between the bottom end of the socket 54a and a shoulder 54b formed on the pin 54 is a spring 54c which yieldingly urges the pin 54 toward the left (Fig. 1). Displacement of the pin 54 in this direction is limited by a pin 54d extending transversely through the pin 54. The inner end of the pin 54 has a convex surface 54e adapted to engage either of the concavities 51 in the spindle 20. It will be noted that the convex surface 54e conforms substantially to the conformation of the shallow concavities 51.

Referring to Fig. 2, it will be noted that the peripheral portions of the end surfaces of the caps 50 and 50a are rounded as shown at 52b. These rounded surfaces 52b are engageable with the convex surface 54e of the pin 54 and these surfaces 52b and 54e are adapted to function as cams to displace the pin 54 to the right (Fig. 1) against the action of the spring 54c. This operation will be explained in detail below.

Referring to Fig. 1, the shaft 55a projects through a wall 11 of the frame 10. The pin 54 projects through a wall 12 of the frame 10. The walls 11 and 12 are in opposed relation and secured to the opposing surfaces thereof are guiding devices 100 and 101, the guiding device 100 being secured to the wall 11 and the guiding device 101 being secured to the wall 12. These guiding devices 100 and 101 are in reality parts of the frame 10. Referring to Figs. 3 and 4, it will be noted that the guide members 100 and 101 comprise somewhat socket-shaped portions 102 and 103, respectively, formed by flanges formed integral with plates 104 and 105 which are secured to the walls 11 and 12, respectively, by spot welds or any other suitable means. The flanges forming the somewhat socket-shaped members 102 and 103 flare outwardly from each other toward the front and top of the frame 10 and it will be readily understood that when a spindle 20 is introduced in the machine, these flanges will engage the cylindrical surfaces of the caps 50 and 50a and will guide the spindle into a position wherein it is alined with the shaft 55a and the pin 54. It will be noted that the opposed surfaces of the plates 104 and 105 are substantially flat. As hereinafter described in detail, the surface of the plate 105 functions as a cam and is adapted to displace the spindle 20 longitudinally when the end of the spindle adjacent the pin 54 is displaced laterally by the operator to bring it into alinement with the pin 54. It will be noted that the spindle 20 is nearly as long as the distance between the opposed surfaces of the plates 104 and 105. In practice, a relatively large manufacturing tolerance (not shown) is provided so that the spindle 20 is somewhat shorter than the distance between the opposed surfaces of the plates 104 and 105 and this manufacturing clearance or tolerance insures that the spindle may be inserted in the duplicating machine with very little effort on the part of the operator.

The operation of inserting the spindle 20 into the duplicating machine so that it will be alined with the shaft 55a and the pin 54 is illustrated in Figs. 1 and 5 to 8, inclusive.

Referring first to Figs. 5 and 6 which are a fragmentary front elevation and a fragmentary plan view, respectively, it will be noted that the operator may introduce the spindle into the machine in such manner that its driven end, or left hand end, is alined with the shaft 55a but the slot 52a in that end is not alined, necessarily, with the driving lug 55. The operator then forces the other end of the spindle 20 downwardly and toward the rear of the duplicating machine as illustrated in Fig. 7. During this displacement of the right hand end (Fig. 7) of the spindle 20, the cap 50a at the right hand end of the spindle rides upon the plate 105 and the plate functions as a cam to displace the spindle 20 longitudinally so that the shaft 55a is displaced longitudinally to the left (Fig. 7) against the action of the spring 55c. It will be noted that in Fig. 7 the right hand end (Fig. 7) of the spindle 20 has the rounded surface 52b of the cap 50a in engagement with the convex surface 54e of the pin 54. Continued displacement of the spindle 20 to bring it into alinement with the pin 54 causes the rounded surface 52b of the cap 50a to ride up on the convex surface 54e and to displace the pin 54 to the right (Fig. 7) against the action of the spring 54c. However, as soon as the spindle 20 is alined with the pin 54, the spring 54c displaces the pin 54 to the left and causes the convex surface 54e to engage the shallow concavities 51 provided in the cap 50a (Fig. 8). Referring to Fig. 8, it will be noted that while the spindle 20 is alined with the shaft 55a and with the pin 54, the lug 55 does not engage the slot 52a in the cap 50 and does not have driving engagement with the spindle. It will also be noted that the shaft 55a is in a retracted position. Now, if the shaft 55a is rotated to wind up the hectograph band 22 upon the spindle 20, or if the spindle 20 is held against rotation while the shaft 55a is being rotated, the lug 55 will come into alinement with the slot 52a in the cap 50 and be urged into it by the spring 55c, whereupon the shaft 55a will have a driving connection with the spindle. This condition of the mechanism is illustrated in Fig. 1.

Now if it is desired to remove the spindle 20 from its position between the shaft 55a and the pin 54, it is only necessary for the operator to grasp the right hand end (Fig. 1) of the spindle and pull it towards himself, whereupon the cap 50a will displace the pin 54 to the right (Fig. 1) against the action of the spring 54c and the left hand end (Fig. 1) of the spindle will rock with respect to the lug 55 until the right hand end of the spindle is withdrawn from between the walls 11 and 12 a sufficient distance to permit the operator to displace it longitudinally to the right (Fig. 1), whereupon the operator may disengage the spindle from the lug 55 and remove the spindle from the machine. It will be noted that it is not necessary for the operator to retract the shaft 55a by pulling upon the knob 55g and that the displacement of the pin 54 is automatic when the operator displaces the right hand end (Fig. 1) of the spindle laterally.

An advantage of the improved construction is that it is not necessary for the operator to aline the slot 52a in the cap 50 with the lug 55 when the spindle is being introduced into the machine. This feature is particularly advantageous when the hectograph band has been attached to the spindle in the manner indicated in Fig. 2 and the band must be kept under tension to prevent the clip 30 from detaching itself from the spindle. In other words, the operator need not twist the spindle around its longitudinal axis to bring the slot 52a into alinement with the lug 55 and the lug itself does not tend to rotate the spindle around its longitudinal axis until it comes into driving engagement therewith. Therefore the clip 30 stays in the same position with respect to the operator's hand as when he started to insert the spindle until the spindle starts to rotate to wind the band thereon.

In practice, the operator employs his right hand to insert the spindle between the shaft 55a and the pin 54 and employs his left hand to operate the mechanism which drives the shaft 55a. As soon as the spindle has been brought into the position wherein it is shown in Fig. 8, the operator operates the winding mechanism so that the lug 55 is brought into driving engagement with the spindle.

While we have illustrated the invention with an unloaded spindle i. e. a spindle upon which no hectograph band is wound, it will be readily understood that the construction is particularly advantageous when a loaded spindle is being inserted in the machine. Loaded spindles are relatively heavy but as long as the operator does not need to bring the spindle into driving engagement with the lug 55, the operation of inserting the spindle in the machine is simple and does not require much effort or care on the part of the operator.

We claim:

1. In a duplicating machine, the combination of a frame, a driven pin slidably and rotatably journaled in said frame and having a lug projecting therefrom, a second pin slidably journaled in said frame and disposed in opposed relation to the first mentioned pin, springs yieldingly urging said pins toward each other, said second pin having a convex surface disposed in opposed relation to said lug, said convex surface projecting from a surface of said frame, and a spindle provided with concave ends, one of said concave ends being provided with a slot for driving engagement with said lug and the other concave end being adapted to journal on said convex surface, said spindle being of such length that when said slotted end thereof is alined with said driven pin in such manner that said lug abuts against the concave surface thereof, said spindle co-operates with said surface of said frame so that when said other end of said spindle is urged laterally toward said second pin, said spindle is displaced longitudinally by said surface on said frame and displaces the driven pin longitudinally until said other end of said spindle is alined with said second pin.

2. In a duplicating machine, the combination of a frame, a driven pin slidably and rotatably journaled in said frame and having a lug projecting therefrom, a second pin slidably journaled in said frame and disposed in opposed relation to the first mentioned pin, a spring yieldingly urging said driven pin toward said second pin, and a spindle provided with a concave end having a slot for driving engagement with said lug, the other end of said spindle being adapted to journal on said second pin, said spindle being of such length that when said slotted end thereof is alined with said driven pin in such manner that said lug abuts against the concave surface thereof, said spindle co-operates with a surface of said frame so that when said other end of said spindle is urged laterally toward said second pin, said spindle is displaced longitudinally by said surface on said frame and displaces the driven pin longitudinally until said other end of said spindle is alined with said second pin.

3. In a duplicating machine, a spindle having a slot therein, a duplicating band, a fastening clip attached to one end of said band and having a portion cooperating with said slot to hold the band secured to said spindle so long as a force is exerted between the spindle and band in a direction to wind the band on the spindle, a frame having holding means for said spindle comprising a pair of spring pressed pins projecting from the framework toward each other, said spindle having concavities in the ends thereof for receiving said pins and having slots in the bottoms of said concavities, one of said pins having a projection engageable with one of said slots in the end of the spindle which projection is rotatable in the concavity in the spindle to aline it with the slot therein, and guides on the framework for guiding the spindle ends to said pins, one of said guides being adapted to displace said spindle longitudinally when it is inserted between said pins by first engaging one of said concavities with the outer end of said projection on one of said pins and then urging the other end of the spindle to the other pin.

4. In a duplicating machine, the combination of a frame, a driven pin rotatably journaled in said frame and having a lug projecting therefrom, a second pin slidably journaled in said frame and disposed in opposed relation to the first-mentioned pin, a spring yieldingly urging said second pin toward said driven pin, said second pin having a convex surface disposed in opposed relation to said lug, said convex surface projecting from a surface of said frame, and a spindle provided with concave ends, one of said concave ends being provided with a slot for driving engagement with said lug and the other concave end being adapted to journal on said convex surface, said spindle being of such length that when said slotted end thereof is aligned with said driven pin in such manner that said lug abuts against the concave surface thereof, said spindle co-operates with said surface of said frame so that when said other end of said spindle is urged laterally to said second pin, said spindle is guided by said surface on said frame and said spindle displaces said second pin longitudinally until said spindle is aligned with said second pin.

5. Apparatus whereby a spindle adapted to be driven is quickly insertable and withdrawable from its mount, comprising a framework having oppositely and yieldingly mounted spindle carriers, one of which carriers has driving means for engaging co-operative driven means provided upon said spindle, and a guide on said framework adjacent said other carrier whereby, when one extremity of said spindle is initially placed against said driving means irrespective of proper driving alignment therewith, the other end of said spindle is, upon the application of pressure, displaced longitudinally and guided into alignment with said other carrier.

6. In a duplicating machine, the combination of a frame, a driven pin rotatably journaled in said frame and having a lug projecting therefrom, a second pin journaled in said frame and disposed in opposed relation to the first-mentioned pin, a spring yieldingly urging one of said pins toward the other, surfaces on said frame from which said pins project, and a spindle provided with concave ends, one of said concave ends being provided with a slot for driving engagement with said lug and the other concave end being adapted to journal on said second pin, said spindle being of such length that when one of its concave ends is positioned against one of said pins, said spindle co-operates with one of said surfaces of said frame so that when the other end of said spindle is urged laterally to the other pin, said spindle is guided by the last-mentioned surface and is displaced longitudinally thereby until it is aligned with both of said pins.

7. In a duplicating machine, a spindle, and a frame having holding means for said spindle comprising a pair of spring pressed pins projecting from the frame toward each other, said spindles having concavities in the ends thereof for receiving said pins and having a slot in the bottom of one of said concavities, one of said pins having a lug engageable with said slot to make a driving connection with said spindle, said spindle being of such length that when said slotted end thereof is aligned with said lug in such manner that said lug abuts against the concave surface thereof, said spindle co-operates with said frame so that when said other end of said spindle is urged laterally toward the other pin, said spindle is displaced longitudinally by said frame and displaces the pin having said lug longitudinally until said other end of said spindle is aligned with said other pin.

8. In a duplicating machine, the combination of a frame, a driven pin slidably and rotatably journaled in said frame and having a lug projecting therefrom, a second pin journaled in said frame and disposed in opposed relation to the first-mentioned pin, a spring yieldingly urging said driven pin toward said second pin, said second pin having a convex surface disposed in opposed relation to said lug, said convex surface projecting from a surface of said frame, and a spindle provided with concave ends, one of said concave ends being provided with a slot for driving engagement with said lug and the other concave end being adapted to journal said convex surface, said spindle being of such length that when said slotted end thereof is aligned with said driven pin in such manner that said lug abuts against the concave surface thereof, said spindle co-operates with said surface of said frame so that when said other end of said spindle is urged laterally toward said second pin, said spindle is displaced longitudinally by said surface on said frame and displaces the driven pin longitudinally until said other end of said spindle is aligned with said second pin.

9. Apparatus whereby a spindle adapted to be driven is quickly insertable and withdrawable from its mount, comprising a framework having oppositely mounted spindle carriers, means mounting one of said carriers for axial yielding movement, driving means upon one of said carriers for engaging co-operative driven means provided upon the spindle, and a guide on said framework adjacent said other carrier, whereby when one extremity of a spindle is initially placed against said driving means irrespective of proper driving alignment therewith, upon application of pressure upon the spindle said yielding carrier is displaced axially and the remaining end of the spindle is guided into alignment with said other carrier.

10. Apparatus whereby a spindle adapted to be driven is quickly insertable and withdrawable from its mount, comprising a framework having oppositely mounted spindle carriers, means mounting one of said carriers for axial yielding movement, driving means upon one of said carriers for positive interlocking engagement with co-operative driven means provided upon the spindle, and a guide on said framework adjacent said other carrier, whereby when one extremity of a spindle is initially placed against said driving means irrespective of proper driving alignment therewith, upon application of pressure upon the spindle said yielding carrier is displaced axially and the remaining end of the spindle is guided into alignment with said other carrier.

11. In a duplicating machine, the combination of a spindle, a framework, opposite spindle carriers mounted in said framework, means for mounting one of said carriers for axial yielding movement, carrier-engaging means carried by the respective ends of said spindle, driving means on one of said carriers for positive interlocking engagement with one of said carrier engaging means, and guide means on said frame-work adjacent the other said carrier, whereby when one extremity of a spindle is initially placed against said driving means irrespective of proper driving alignment therewith, upon application of pressure upon the spindle said yielding carrier is displaced axially and the remaining end of the spindle is guided into alignment with said other carrier.

ALFRED MARCHEV.
JOHN W. HERNLUND.